US012228918B2

(12) United States Patent
Malakuti et al.

(10) Patent No.: US 12,228,918 B2
(45) Date of Patent: Feb. 18, 2025

(54) SYSTEM AND METHOD FOR INTEROPERABLE COMMUNICATION OF AN AUTOMATION SYSTEM COMPONENT WITH MULTIPLE INFORMATION SOURCES

(71) Applicant: ABB Schweiz AG, Baden (CH)

(72) Inventors: Somayeh Malakuti, Dossenheim (DE); Johannes Schmitt, Ladenburg (DE); Prerna Juhlin, Heidelberg (DE)

(73) Assignee: ABB Schweiz AG, Baden (CH)

( * ) Notice: Subject to any disclaimer, the term of this patent is extended or adjusted under 35 U.S.C. 154(b) by 570 days.

(21) Appl. No.: 17/469,908

(22) Filed: Sep. 9, 2021

(65) Prior Publication Data
US 2021/0405629 A1 Dec. 30, 2021

Related U.S. Application Data

(63) Continuation of application No. PCT/EP2020/056519, filed on Mar. 11, 2020.

(30) Foreign Application Priority Data

Mar. 11, 2019 (EP) .................................... 19161994

(51) Int. Cl.
*G06F 16/25* (2019.01)
*G05B 19/045* (2006.01)
(Continued)

(52) U.S. Cl.
CPC ..... *G05B 19/41885* (2013.01); *G05B 19/045* (2013.01); *G05B 19/048* (2013.01); *G05B 2219/25484* (2013.01)

(58) Field of Classification Search
CPC . G05B 19/045; G06F 16/254; G06F 16/2365; G06F 16/252
See application file for complete search history.

(56) References Cited

U.S. PATENT DOCUMENTS 11,132,375 B2 * 9/2021 Apps ....................... G06F 16/25
2004/0199905 A1 10/2004 Fagin et al.
(Continued)

FOREIGN PATENT DOCUMENTS

CN 101082932 A 12/2007
CN 101201842 A 6/2008
(Continued)

OTHER PUBLICATIONS

China National Intellectual Property Administration, Office Action in Chinese Patent Application No. 202080020489.2, 23 pp. (Nov. 21, 2023).
(Continued)

*Primary Examiner* — Alvin H Tan
(74) *Attorney, Agent, or Firm* — Leydig, Voit & Mayer, Ltd.

(57) ABSTRACT

A computer system for interoperable data exchange between a plurality of information systems via a digital representation service associated with a digital representation of a physical device with each information system being at least one of an information source and an information consumer regarding data associated with the physical device, the digital representation being a virtual entity replicating data of the physical device and data associated with the device life cycle, includes: at least one digital representation service for the physical device, the at least one digital representation service having: an interface for receiving a request for device related data; a management module for generating and updating the digital representation of the device, the digital representation storing a plurality of data models with each stored data model being associated with a particular information system; and a semantic relations library storing semantic relations between model element types from stored data models.

17 Claims, 8 Drawing Sheets

(51) Int. Cl.
   *G05B 19/048* (2006.01)
   *G05B 19/418* (2006.01)

(56) References Cited

U.S. PATENT DOCUMENTS

| | | |
|---|---|---|
| 2009/0083297 A1 | 3/2009 | Pohl et al. |
| 2010/0030767 A1 | 2/2010 | Kim et al. |
| 2012/0246105 A1 | 9/2012 | James |
| 2015/0058314 A1 | 2/2015 | Leclerc et al. |
| 2016/0132838 A1 | 5/2016 | Grossman et al. |
| 2019/0034811 A1 | 1/2019 | Cuddihy et al. |

FOREIGN PATENT DOCUMENTS

| | | |
|---|---|---|
| CN | 101753619 A | 6/2010 |
| CN | 102103504 A | 6/2011 |
| CN | 102682122 A | 9/2012 |
| CN | 103149849 A | 6/2013 |
| CN | 105453080 A | 3/2016 |
| CN | 105518671 A | 4/2016 |
| CN | 109410650 A | 3/2019 |
| EP | 3401800 A1 | 11/2018 |
| WO | WO 2013/181588 A2 | 12/2013 |
| WO | WO 2020/182892 A1 | 9/2020 |

OTHER PUBLICATIONS

European Patent Office, Extended European Search Report in European Patent Application No. 19161994.9, 10 pp. (Jul. 24, 2019).

China National Intellectual Property Administration, Notification to Grant in Chinese Patent Application No. 202080020489.2, 7 pp. (Mar. 14, 2024).

\* cited by examiner

SYSTEM AND METHOD FOR INTEROPERABLE COMMUNICATION OF AN AUTOMATION SYSTEM COMPONENT WITH MULTIPLE INFORMATION SOURCES

CROSS-REFERENCE TO PRIOR APPLICATION

This application is a continuation of International Patent Application No. PCT/EP2020/056519, filed on Mar. 11, 2020, which claims priority to European Patent Application No. EP 19161994.9, filed on Mar. 11, 2019. The entire disclosure of both applications is hereby incorporated by reference herein.

FIELD

The present invention generally relates to electronic data processing, and more particularly, relates to methods, computer program products and systems for interoperable communication between multiple information systems providing data related to a device with connectivity to a network.

BACKGROUND

For proper operation of physical devices used by or in technical systems, such as for example automation systems, information about the life cycle of the device can be of high relevance. For example, information associated with the device which was already created during the engineering phase of the device may be of relevance when operating the device or for the maintenance of the device. Typically, such information associated with the device is scattered across multiple heterogeneous information sources which all store parts of the life cycle information of the device. Typically, such information sources (e.g., database systems or knowledge management systems) are not mutually interoperable.

Nowadays, many devices used in technical systems have digital representations often referred to as digital twins. Both terms are used as synonyms herein. Such a digital representation is a virtual entity replicating data, structure and functions associated with the device. Such a digital representation (digital twin) includes data models in a particular format for describing the life cycle of the physical device.

Information which is useful for the digital twin of the device is typically created and maintained in separate databases/tools (information sources), expressed in different proprietary or standardized formats; thereby not readily exchangeable with other tools and with the digital twin of the device itself. Furthermore, the relations among the individual data of the different information sources are usually not documented in a machine-readable way, creating potential for missed analyses, unnecessary repetitions, and even inconsistencies leading to errors. Typically, due to lack of interoperability at the syntactic or semantic levels, these information sources cannot exchange information with each other in a seamless manner.

This leads to a broken information flow across the life cycle of a device, and increases the risk that data exchange between the device and such information sources fails because of lack of interoperability when the device or any related information consumer tries to access device related data in the various information sources.

SUMMARY

In an embodiment, the present invention provides a computer system for interoperable data exchange between a plurality of information systems via a digital representation service associated with a digital representation of a physical device with each information system being at least one of an information source and an information consumer regarding data associated with the physical device, the digital representation being a virtual entity replicating data of the physical device and data associated with the device life cycle, the system comprising: at least one digital representation service for the physical device, the at least one digital representation service comprising: an interface configured to receive a request for device related data; a management module configured to generate and update the digital representation of the device, the digital representation being configured to store a plurality of data models with each stored data model being associated with a particular information system; and a semantic relations library storing semantic relations between model element types from stored data models of different information systems, wherein each digital representation service of the at least one digital representation service is configured to: generate a mapping between model elements of data models associated with at least two different information systems via the semantic relationships as defined in the semantic relations library as a generated mapping; and in response to the request, execute data exchange between at least two information systems in accordance with the generated mapping.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
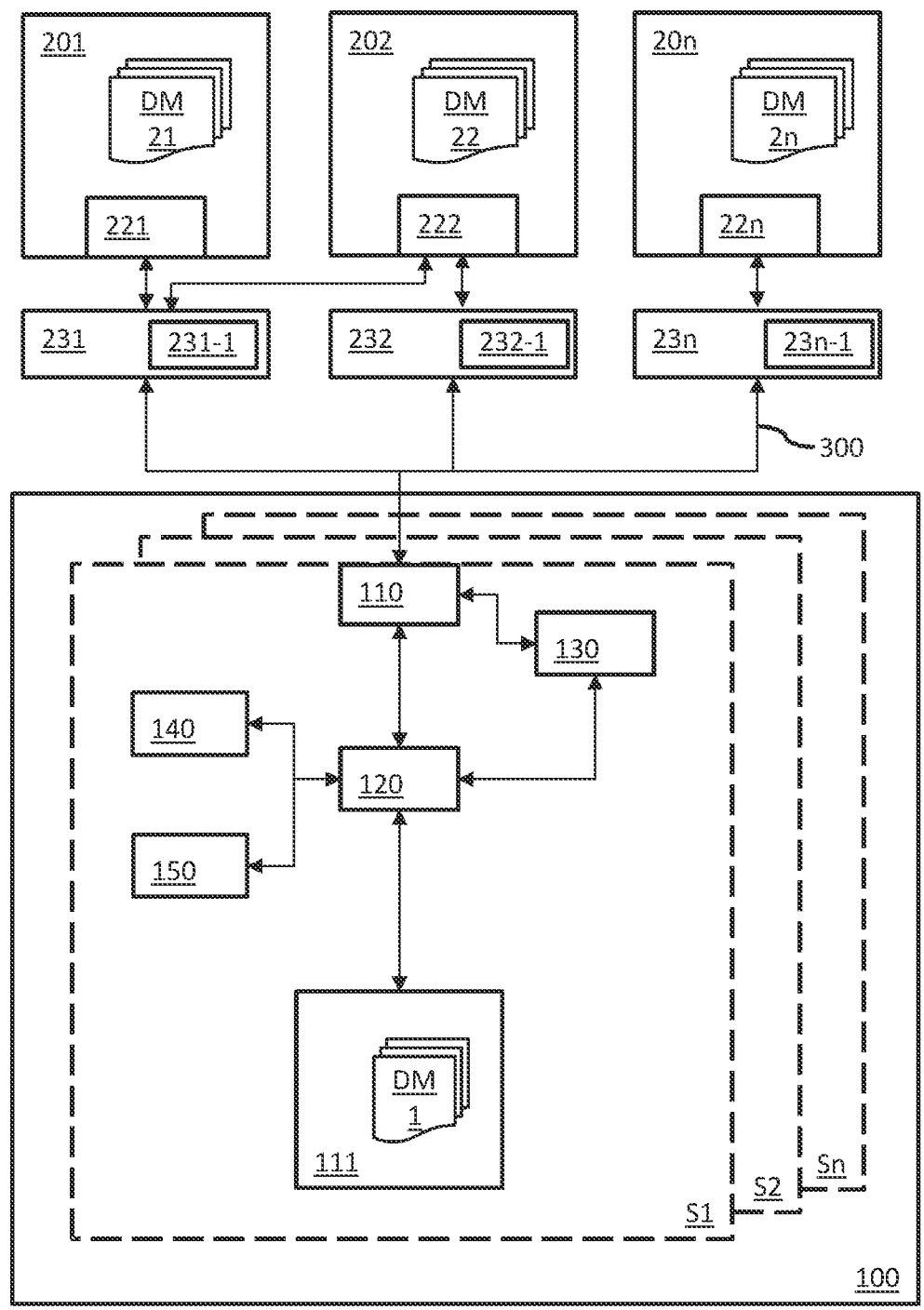
FIG. 1 is a block diagram illustrating a system landscape with a computer system for interoperable data exchange between a plurality of information systems according to an embodiment.

There is a need to provide systems and methods to improve interoperable data exchange between information systems (i.e., information consumers and information sources) connected to the same network to exchange data associated with a particular physical device (i.e., data related to the life cycle of the device). Thereby, information consumers/sources often have incompatible data models which prevent communication and data exchange between such information systems. The herein disclosed approach enables any information consumer to exchange device related data with any information source via the digital representation of said physical device, and avoids failure of the data exchange between such information systems.

This technical problem is solved by the features of the embodiments described herein. Thereby, a digital representation of the device (i.e., a digital twin of the device) is augmented with a semantic description which defines the life cycle aspects and relevant information about the device which is to be included in the digital representation. In other words, the digital twin of the device can be seen as an aggregation of data models associated with information systems which provide device related data over the device life cycle. The digital twin further knows the local identifiers of the device used in the various information systems. For example, such local identifiers can be assigned to a master ID for the device in its digital twin. The data provided by information systems is also augmented with semantic descriptions including descriptions of the kinds of data models provided by the information systems. The information systems are then dynamically discovered by using a discovery module of a digital representation service, and, based on semantic descriptions, data obtained from information sources is automatically matched against the data required by respective information consumers resulting in corresponding mappings of data model elements which allow the respective information systems (consumer and source systems) interoperable data exchange regarding device related data via said mappings.

The information for a digital twin of the device typically comes from various life cycle phases of the device, such as for example, early configuration of the device, ordering stage, different engineering phases, and the operations and maintenance phases. There usually exist semantic relationships between corresponding data objects of the different information sources. For instance, the "output power" of a particular motor (physical device) as given in a particular technical specification during its ordering phase is related to its "power losses" calculated during its engineering phase and to its "output power" and "efficiency" as measured during its actual operation. In the past, error prone, repeated manual efforts were relied upon to address the different semantics and syntax for different use cases: experts had to peruse the available data in the different information sources in order to find those which are meaningfully relevant to the use case at hand, followed by manual extraction of respective individual data values for utilization. The broken information flow across the life cycle of the device, as well as different syntax and semantics of data in each information source/consumer, is an obstacle to interpreting the semantics of the information and to map the information from one life cycle phase to another. As a result, the operation of the device may be slowed down and the number of errors in exchanging data may be increased.

The drawbacks of the approaches applied in the prior art can be overcome for devices with network connectivity by enabling the digital twins of the devices to collect data required from associated information systems without human interaction. The collection of data may depend on the lifecycle of the corresponding digital twin. For example, it may start when a device is operating or even before the device is installed in the system.

In one embodiment, a computer system is proposed for interoperable data exchange between a plurality of information systems via a digital representation service associated with a digital representation of the physical device. The device has network connectivity and external information sources provide data related to said device via a network. Network connectivity as used herein means that device is able to connect to the network either directly or via gateway. The data exchange occurs via so-called model providers. There can be a plurality of model providers which can be seen as a kind of abstraction layer between the device and the information systems (sources/consumers). Each model provider can be connected to one or more information systems. Each model provider has a discovery daemon which allows the model provider to expose itself via the network in a way that it can be discovered by other network component via a discovery mechanism. Further, a model provider has semantic model kind descriptions which are semantic descriptions of the kinds of models provided by the one or more information systems to which the respective model provider is connected. Further, each model provider has a function which allows the model provider to retrieve a data model from a connected information system and provide it to a model requesting entity. For example, the model requesting entity can be the physical device.

The device has at least one co-existing digital representation (digital twin) being a virtual entity replicating data of the physical device and data associated with the device life cycle. The computer system provides one or more digital representation services. One device may have multiple digital representations. Therefore, in other words, multiple digital representation services may be provided by the system with each digital representation service being for a corresponding digital representation of the device. A digital representation service has a management module which can update the digital representation of said service.

For example, a digital representation service may initially not include a digital representation but generate the digital representation based on described lifecycle semantics stored in the digital representation service. An example semantics may lead to generating the digital representation when the corresponding physical device is connected to the network. The physical device may then be discovered (like other information systems) and the digital twin (i.e., its digital representation) can be generated by the management module reflecting the data model(s) exposed by the physical device. This digital twin can then be enhanced by data models from other information sources which are related to the data models of the physical device. In other words, a digital twin of the device may evolve over the life cycle of the device by enriching the digital twin with data models of respective information systems once they become useful for the digital twin in that the usability of the digital twin is enhanced for obtaining device related data form other information sources. The relations can be defined via identifiers identifying said device in the various information systems.

Each digital representation service has an interface to receive a request for device life cycle information from an information consumer connected to the network. For example, the request may be received from an application via a respective API (digital twin API) and ask for life cycle data stored by an external information source.

In one embodiment, the digital representation service further stores and provides a semantic description of the digital representation of the device. The semantic description includes at least descriptions of model kinds of interest for the digital representation. A model kind of interest describes a data model which is of a kind that is defined as providing useful data to the digital twin of the device. The semantic description is therefore a component which supports the evolvement of the digital twin over time in that it allows to dynamically augment the data models of the digital twin with regards to the provisioning of device related data.

The digital representation service further stores a plurality of data models wherein each data model is associated with a particular information source. The plurality of stored data models actually form the digital twin of the device which is associated with said digital representation service. In other words, a current digital twin of the device includes already some data models which originate in data models used by information sources providing life cycle data for the device. It is to be noted that the plurality of models can include copies of the data models or just references to said data models. Storing a model, as used herein, can refer to storing a copy of the model or storing a corresponding reference to the model. In any case it is possible to access the data model via the stored plurality of data models. Further, the digital representation stores the identifiers of said device used in such information systems from which data models are already stored in the digital representation. For example, the digital twin may use the serial number of the device as a master ID in the digital representation and store further IDs of the device which are used as device identifiers in such information systems providing device related data via the digital twin.

The digital representation service further includes a semantic relations library storing semantic relations between model element types from data models of different information sources.

The management module of the digital representation service coordinates the various tasks performed by the service. In one embodiment, a discovery module is configured to discover one or more model providers via the interface of the digital representation. The discovery module is advantageous when a request for data is received by the digital representation service which cannot be answered by information sources whose data models are already stored in the digital representation. In this case, the discovery module may search for additional model providers which may be suitable to gain access to the requested data provided by a respective information source. The discovery mechanism makes use of the discovery daemons of the various model providers. A discoverable model provider has an active discovery daemon indicating to the discovery module of the physical device the availability of the respective model provider.

In case one or more model providers are discovered, their semantic model kind descriptions can be obtained from the discovered model providers in relation to the information provided by the respective one or more information sources via the interface. Obtaining information from the model providers may occur via a pull or push mechanism. Using the pull mechanism, the digital representation service may query the model providers for the respective information and the model providers respond to such queries to provide the requested information to the digital representation service. The push mechanism may be advantageous to use for information sources which include primarily data related to the device (such as the device itself or an engineering tool storing engineering data related to the device). Such information sources may already know the master ID used by the digital representation and can automatically push the device related data to the digital twin of the device after a connection has been established via the discovery of the corresponding model provider.

The manager module coordinates these activities. In other words, once the manager module is informed by the discovery module that model providers are available, the manager module may receive information pushed by the discovered model provider(s), or may trigger one or more queries to be sent to said model providers via the interface. The queries retrieve the model kind descriptions from the discovered model providers. Thereby, a particular model kind description provides semantic metadata about a particular data model of a corresponding information source. When operating in the pull mode, the manager module compares the discovered model kind descriptions with model kinds of interest stored in a semantic description of the digital representation itself. That is, a check is performed by the digital representation service whether the discovered model providers can provide any data from external information sources which is of use to the digital twin of the device (e.g., to answer a particular application request). If a particular model kind description corresponds to a stored model kind of interest the manager module concludes that the respective data model behind is useful to answer said request and decides to retrieve the respective data from said data model. When operating in the push mode, the manager module may simply receive information from a push based model provider and updates the digital twin accordingly. In one embodiment, when a model provider is discovered, it announces the model kinds that it supports and the manager module keeps this information. Based on this information, the manager module may only query from the model providers that provide the models of interest for the digital representation.

In general, a mapping between model elements of data models associated with at least two different information systems is generated via the semantic relationships as defined in the semantic relations library. In the embodiment where additional data models are dynamically obtained via corresponding model providers to enhance the digital twin over time, a mapping may be generated between model elements of data models associated with model kind descriptions of the discovered model providers and corresponding model elements of data models stored in the digital representation. This mapping is also generated via the semantic relationships as defined in the semantic relations library.

For example, using a semantic relation (A, B, "has actual value"), a model element a that is an instance of model element type A is mapped to a model element b instantiated from model element type B. Furthermore, the corresponding semantic relation can also be inherited. The mapping is generated on the fly when a request comes in. The semantic relations between data models of different information sources are defined in the semantic relations library at the level of model element types. At runtime (i.e., the time at which the request is processed to provide a corresponding response), the mapping is generated at the instance level of the model elements. That is, once the mapping is generated, the digital representation service knows which model element of a first data model in a first data format corresponds to which model element of a second data model in a second data format. This describes a situation where the digital twin of the device is to be enhanced with data from two different information systems with different formats.

Once the mapping is generated, it is straight forward for the manager module to retrieve the requested data from the respective information sources via the corresponding model providers by executing data access to the requested data in accordance with the mapping and providing the requested data to requesting information consumer (i.e., executing the data exchange between at least two information sources).

Embodiments of the disclosed system architecture and method allow to enhance the digital twins of devices dynamically with data from any information system which is discoverable via a corresponding model provider. The mapping to the requested data is performed automatically without any human intervention using predefined semantic relations from a corresponding library. That is, the digital representation service of a device automatically establishes connections to the requested data of the information sources in an interoperable manner even when the information sources have different formats.

In one previously described embodiment, it is assumed that the semantic relations needed for responding to the data request are already defined in the semantic relations library. In one embodiment, the semantic relations can be continuously enhanced on the fly by establishing new semantic relations in the semantic relations library as they become known by the digital twin service. Assuming that the discovery module discovers a particular model provider with a particular model kind description matching with the model kinds of interest included in the semantic description, but the digital twin of the device does not yet have a copy of or a reference to the respective data model in the plurality of data models, the corresponding data model as provided by the particular model provider is added to the plurality of data models (either by storing a copy of the entire data model or just a reference to said data model).

The digital representation service can then derive one or more model element types from the added data model. In this embodiment, the interface of the digital representation service allows to receive, from a user or from a technical specification, semantic relations between the one or more model element types of the added data model and model element types of pre-existing data models to connect model elements from different information sources along the life cycle of the device. For example, a graphical user interface may offer the derived model element types to a user with domain expert knowledge to receive new semantic relations which can be established between the added data model and other data models already pre-existing in the plurality of data models. In an alternative implementation, semantic relations may be derived from technical specifications which define standards for the semantics of such devices.

In one embodiment, the digital representation service is further configured to process model elements obtained from the discovered information sources to manage the life cycle of the digital representation using a state machine reflecting the life cycle of the digital representation. For example, different semantics can be considered to construct or destruct the instances of the digital representation. These semantics may be described using a state machine. The state machine is interpreted against the information that comes from model providers, and accordingly, digital representation instances are constructed or destructed.

In one embodiment, the digital representation service is further configured to generate a graph representation reflecting the semantic relations between model element types, the graph representation being used for future queries by a user.

In one embodiment, the digital representation service further comprises a configuration module adapted to switch between a replication mode and a referencing mode for each data model wherein, in the replication mode, accessed information source data is copied to the digital representation, and in the referencing mode references to the accessed information source data are stored in the digital representation.

In one embodiment, the configuration module is further adapted to: select a deployment mode for the digital representation, wherein the deployment mode can be selected for each data model enclosed in the digital representation from any one of the following: deployment to a cloud network, edge or to the device itself. The adopted deployment strategy may differ per data model.

In one embodiment, the configuration module is further adapted to activate a synchronization mode for the digital representation wherein a data model associated with an information source associated with a first life cycle phase of the device is synchronized with a data model associated with an information source associated with a second life cycle phase in that parameters of the first life cycle phase are loaded into parameters of the second life cycle phase.

In one embodiment, a computer-implemented method is provided which can be executed to by modules of the computer system to perform the herein described functions and steps for interoperable data exchange between information systems via a digital representation service of a device.

In one embodiment, a computer program product having instructions that, when loaded into a memory of said computer system and executed by at least one processor of the computer system, execute the method steps of said computer implemented method.

Figure 2:
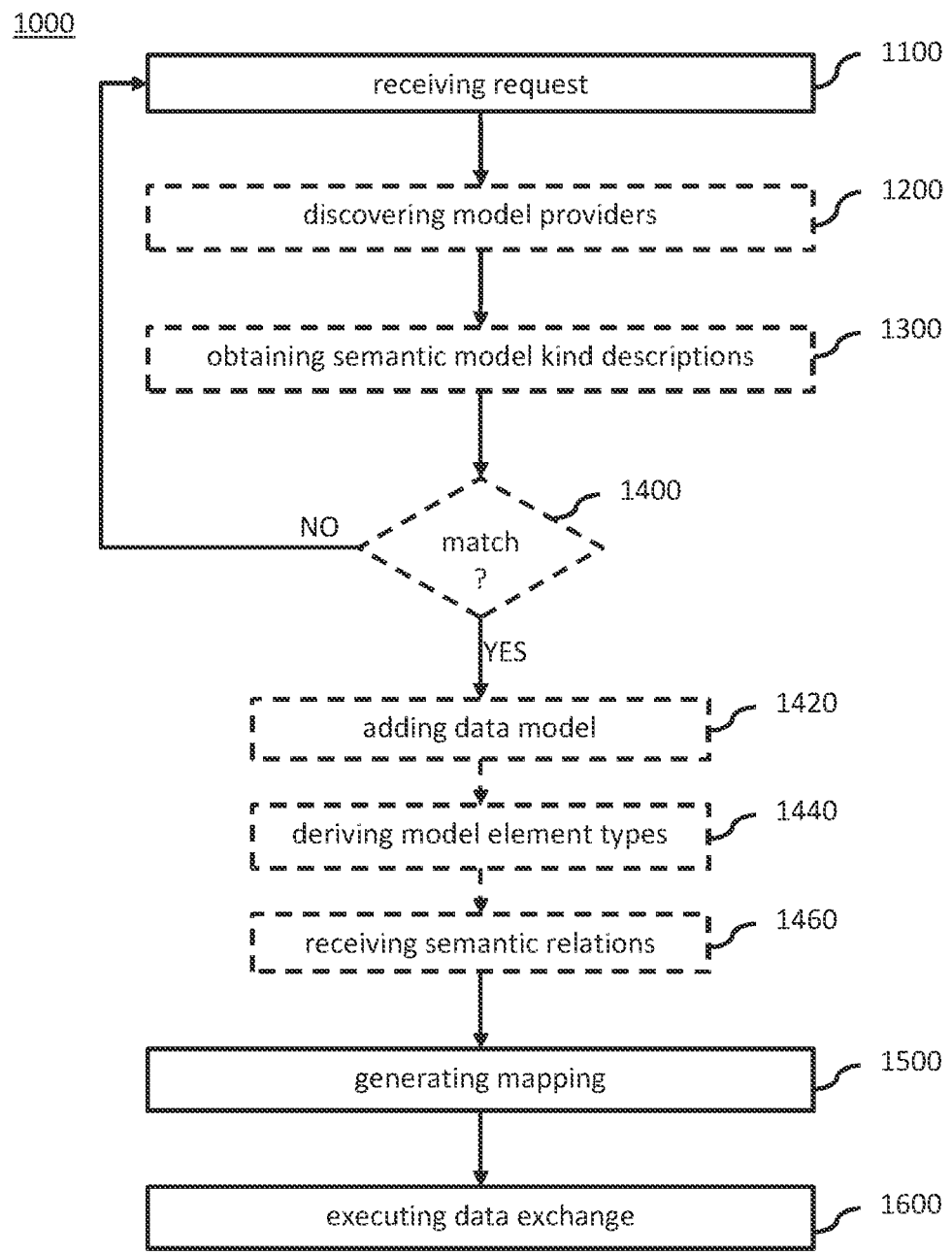
FIG. 2 is a simplified flow chart of a computer-implemented method for interoperable data exchange between a plurality of information systems according to an embodiment.

FIG. 1 is a block diagram of a system landscape with multiple information systems 201 to 20*n* communicating via a computer system 100 according to one embodiment. The computer system 100 is used as an example only and is not intended to limit scope to any implementation details as disclosed in the description of FIG. 1. FIG. 2 is a simplified flow chart of a computer-implemented method 1000 for interoperable data exchange between the plurality of information systems according to an embodiment. The method 1000 is executed by the computer system 100. Therefore, the following description describes the computer system 100 in view of the executed method 1000 and, therefore, refers equally to reference numbers FIG. 1 and FIG. 2. It is to be noted that the following description describes the possible functionality of the computer system 100 in a comprehensive manner including optional features which may be used to perform optional method steps of the computer implemented method 1000. Such optional steps are illustrated by boxes with dashed frames in FIG. 2.

The computer system 100 communicates with other computer systems over a network 300. Thereby, the communication with a plurality of information systems 201 to 20*n* occurs via an intermediate layer of model providers 231 to 23*n*. The purpose of computer system 100 is to enable interoperable data exchange between the plurality of information systems 201 to 20*n* via a digital representation service S1, S2, Sn associated with a digital representation 111 of a physical device. The information systems can be information sources and/or information consumers regarding data associated with the physical device. The digital representation 111 is a virtual entity replicating data of the physical device and data associated with the device life cycle wherein such device life cycle data may be spread over the various information systems. Typically, the data models of the various information systems differ from each other so that data exchange of data related to the device is not possible between such information systems without error prone manual interaction by a user. The computer system 100 overcomes this technical problem with the following features.

The computer system 100 is running one or more digital representation services S1 to Sn for said physical device. In the initial phase, when a physical device may not even exist but the engineering data for the device may already be available, a digital representation service (e.g., S1) may only include the logic to generate a digital twin 111 for the device once an indication is received that the device is now available. Once the physical device finally appears as a real-world object, the digital representation service S1 provides all functions to maintain and expand the digital representation 111 of the device. For one device multiple digital representations may be useful where each digital representation is provided and maintained by its respective digital representation service S1, S2, Sn. A particular digital representation service S1 includes an interface 110 to receive a request for device related data. Such a request may be received 1100 from any one of the information systems 201 to 20n in the role of an information consumer. For example, a maintenance system application may request engineering data of the device which are useful for a maintenance decision to be taken by the requesting maintenance application.

The received request is then processed by a management module 120 of the service S1. The management module 120 includes logic configured to generate and update the digital representation 111 of the device. The digital representation, once created, stores a plurality of data models DM1 with each stored data model being associated with a particular information system 201 to 20n. It is to be noted that the device itself is also considered to be an information system in this context. When the device is initially discovered by the digital representation service S1 (the discovery mechanism is explained further down in the description) the device provides its data models to the service S1 to generate the digital twin 111 of the device with the provided data models. One possible scenario to create the digital twin is that when the device starts operating, it triggers the creation of the digital twin and provides a master ID for the device to the digital twin. This master ID is then used by the digital twin to associated device specific data of different information systems by storing an assignment data structure which assigns local identifiers of the device used by the other information systems to said master ID.

The digital representation service S1 further has a discovery module 130 configured to discover one or more model providers 231 to 23n. Thereby, each model provider is associated with one or more information systems 201 to 20n. The information systems can communicate with their associated model providers via interfaces 221, 222, 22n. In the example, model provider 231 is associated with information systems 201 and 202. Model providers 232 and 23n are associated with the information systems 202 and 20n, respectively. Each model provider also has a so-called model kind description 231-1 to 231-n which provides a semantic description of the information provided by the underlying information systems. In the example, the model kind description 231-1 of the model provider 231 has a semantic description about the kind of data models DM21, DM22 which are provided by the information sources 201 and 202. The model kind description 232-1 of model provider 232 has a semantic description about the kind of data models DM22 which are provided by the information source 202, and so on.

The discovery component can discover 1200 model providers connected to the network 300 if such model providers indicate their presence in the network. For example, to support open-ended numbers of information systems, it is possible to let the digital representation service S1 find information systems by their semantics, not by names or addresses. For this purpose, machine-readable semantics of information and discovery mechanisms in distributed, internetworked automation systems may be used. In the special case that the device itself connects to the network for the first time, the device itself may act as a model provider indicating the presence of the device via the network 300. Of course, the device may also act as an information source only and use a separate model provider for signaling its presence in the network. The discovery module 130 can then discover the device (or its separate model provider) and retrieve the data model(s) of the device as well as its serial number to be used as the master ID for the digital twin of the device. The management module 120 can then generate the digital representation 111 and fill it with the obtained data model(s) and the master ID of the device. The master ID may be deployed to all other discovered model providers to enable the corresponding information systems to relate their local identifiers for said device to the master ID. For example, an installed-base database of an information source may store records including installation ID, installation address, installation data, and the serial number of the device (i.e., the master ID).

Figure 6:
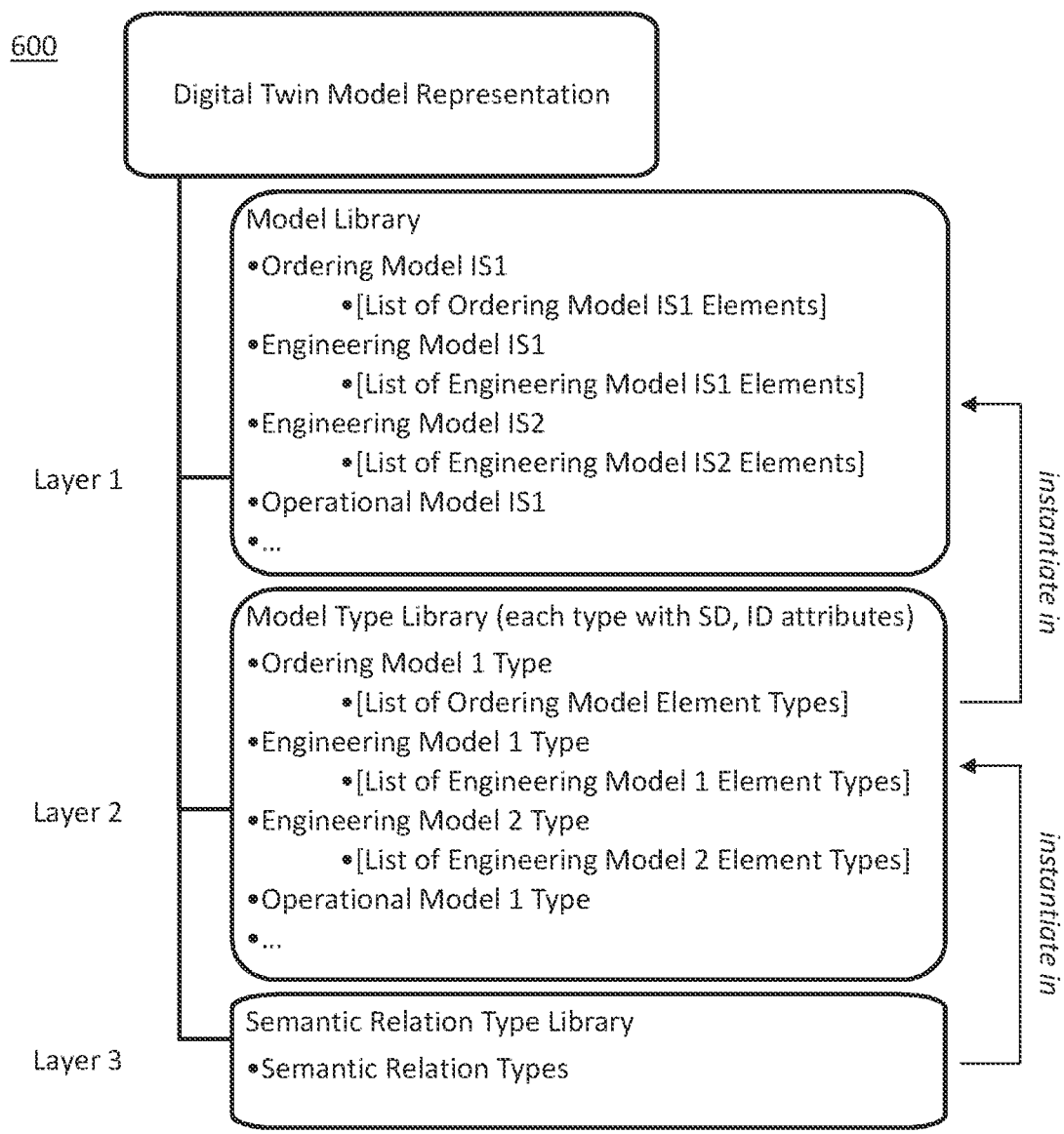
FIG. 6 illustrates multiple layers of a digital representation of a physical device according to an embodiment and depicts how semantic model kind descriptions and semantic relations are incorporated in a digital representation.

The management module obtains 1300 from the discovered one or more model providers 231 to 23n the corresponding semantic model kind descriptions 231-1 to 23n-1 in relation to the information provided by the respective one or more information systems 201 to 20n which are associated with the respective model providers. In general, a particular model kind description 231-1 provides semantic metadata about one or more data models DM21, DM22 of one or more corresponding information systems 201, 202. Turning briefly to FIG. 6, model kind descriptions are shown in Layer 2, by way of example. A model kind description comprises a model type and the model element types within the model type, which are augmented with an attribute providing the semantic description SD of the respective elements, as well as with attributes providing an identifier ID of the respective elements. "IS" is used as an abbreviation for "Information System" in FIG. 6. The semantic description SD can be defined based on some global semantic dictionaries such as eCl@ss or local semantic dictionaries that are defined by a group of companies internally. For example, eCl@ss 10.0.1 may be obtained from: http://www.eclassdownload.com/catalog/product_info.php/cPath/1/products_id/5028/language/de. An example model kind description is "Ordering Model 1 Type", which defines a model containing ordering information of a device and includes a list of Ordering Model 1 element types. The other examples in Layer 2 are self-explanatory. Models in the Model Library of Layer 1 are instantiated from the types as defined in the Model Type Library of Layer 2. FIG. 6 is described in more detail below.

The digital representation service S1 further includes a semantic relations library 150 storing semantic relations between model element types from data models of different information sources 201 to 20n. In a situation where the computer system is already running for a certain period during which multiple requests requiring data from different information systems have been received and processed by the digital representation service, the digital representation 111 already includes a plurality of data models from different information systems. For such data models the semantic relations library 150 already stores semantic relations which can be used for a mapping between elements of the data models across information systems. The management module is configured to generate 1500 such a mapping between model elements of different data models via the semantic relationships as defined in the semantic relations library.

In response to the request, the management module finally executes 1600 the data exchange between at least two information systems in accordance with the mapping. That is, the digital twin 111 of the physical device together with the semantic relations defined in the semantic relations library 150 acts as a transformer with regards to different formats of the data models of the respective information consumer and information source. The digital twin 111 stores replica of the respective data models and the semantic relations define how such models can be mapped. The mapping itself at the model element instance level is then executed when a request is received and the management module knows which data is requested from which information source for which information consumer.

A further feature of the computer system 100 is that the digital representation 111 and the corresponding semantic relations can dynamically evolve over time. In this embodiment, the digital representation service S1 further includes a semantic description 140 of the digital representation 111 including model kinds of interest for the digital representation 111. In other words, the semantic description knows which kinds of data models may be of interest to further enhance the digital twin of the device. The management module 120 may obtain 1300 from the discovered one or more model providers 231 to 23*n* semantic model kind descriptions 231-1 to 23*n*-1 in relation to the information provided by the respective one or more information systems 201 to 20*n*. As already mentioned, a particular model kind description 231-1 provides semantic metadata about one or more data models DM21, DM22 of one or more corresponding information systems 201, 202. In other words, the management modules compares 1400 a particular model kind description 232-1 of a discovered model provider 232 with the model kinds of interest included in the semantic description 140. If there is no match NO, then for the current request a data exchange in response to the request cannot be executed. In this case, the computer system 100 waits for a new request. If there is a match YES, and if a data model DM22 corresponding to the particular model kind description 232-1 is not yet included in the plurality of data models DM1, the management module adds 1420 the corresponding data model DM22 as provided by the particular model provider 232 to the plurality of data models DM1 in the digital twin 111. At this point in time, the necessary data models for executing the requested data exchange are known. Then, one or more model element types are derived from the added data model. Now, the semantic relations are established for executing the data exchange. For establishing the semantic relations, the computer system receives 1460, from a user or from a technical specification, semantic relations between the one or more model element types of the added data model and model element types of pre-existing data models to connect model elements from different information sources. Typically, the various information systems provide data which related to different stages of the device life cycle. That is, in other words, the received semantic relations connect model elements along the life cycle of the device. In one implementation, semantic relations may be received from a domain expert via a corresponding human-machine interface which provides a mapping tool to the expert user to define semantic relations between the derived model element types. In another implementation, the mapping module may access a technical specification which defines the semantics for the derived model element types, and may automatically derive corresponding semantic relations from such specification.

By extending the data models of the digital twin and the semantic relations on the fly (i.e., during the operation of the computer system) to facilitate interoperable data exchange between information systems, the digital twin of the device continuously evolves during the operation of the computer system and enhances its mapping capability to improve the ability to establish interoperable data exchange for an ever growing number of new requests.

Figure 3:
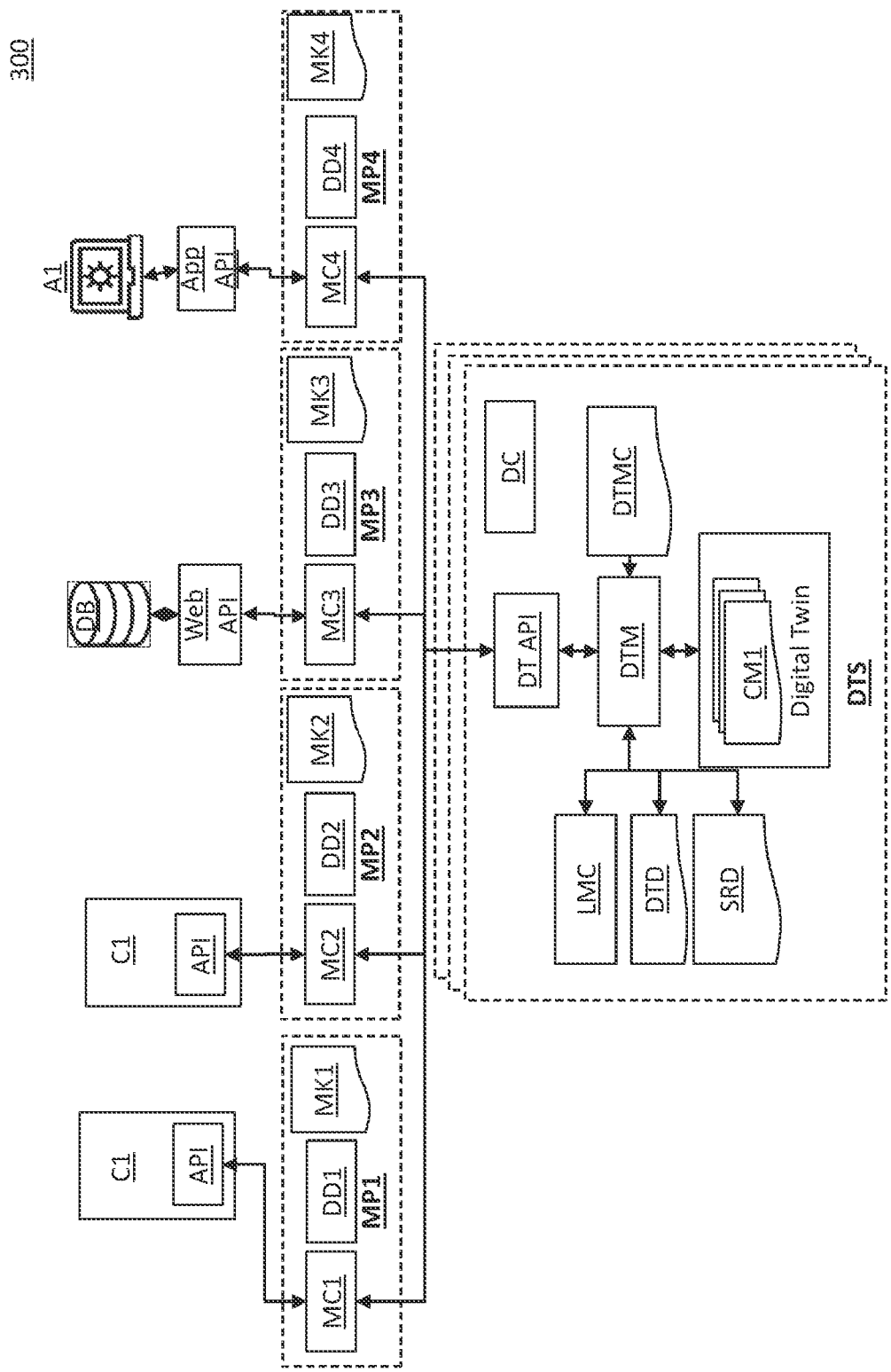
FIG. 3 shows an example embodiment of a system landscape with various information systems communicating via the digital representation of an associated device.

FIG. 3 illustrates an example system landscape 300 with multiple information systems C1, C2, DB, A1 exchanging data via a digital representation (twin) service DTS. The digital twin service DTS maintains a digital twin of a device. It is to be noted that there can be multiple digital twins in multiple DTS services for a particular device, each one comprising specific kinds of data models and having its own lifecycle semantics. In the example, external cloud computers C1 and internal cloud computers C2 are connected to the network via corresponding application programming interfaces API. Further, existing databases DB are connected to the network via corresponding Web APIs. Further, existing applications A1 are connected to the network via corresponding App APIs. In the example, A1 may act as an information consumer asking for device related data which can be provided by DB as an information source. In the example, each information source has its dedicated model provider MP1 to MP4 which can communicate with the information systems via their APIs. Further, each model provider can communicate over the network with the digital twin service via an interface DT API of the digital twin service.

The model providers MP1 to MP4 can retrieve information from the information systems and feed it into the DTS. For example, data models of the associated information sources can be retrieved by the corresponding model collectors MC1 to MC4. Such data models are then provided to the Digital Twin of DTS where they are stored as collected models CM1. In order to be able to communicate with the DTS, the various model providers are initially discovered by the DTS by using a discovery component DC. Each model provider is running a discovery daemon DD1 to DD2 which exposes information to the network which can be discovered by the discovery component of DTS. The discovery component may use standard discovery mechanisms (e.g., name or address based discovery) to find information sources, or it may discover information sources by their semantics exposed as machine-readable semantics of information by the discovery daemons. Any discovery mechanism which is appropriate to discover components in distributed, inter-networked automation systems may be used a person skilled in the art for implementing the discovery component DC. For example, DC may discover an information source being a OPC UA server via the corresponding discovery daemon of the associated model provider.

Each model provider has a model kind description MK1 to MK4. The model kind description of a particular model provider provides a semantic description of the underlying information. In other words, MK1 provides a semantic description of the data models which are provided by C1. Such model kind descriptions can be read by the DTS once the model provider has been discovered. Thereby, each information source may use a proprietary local identifier for the device which is represented by the digital twin of DTS. A local identifier for the device is a unique identifier for said device with the respective information system. For associating data records of a particular information source using a particular local identifier for the device, the local identifiers may be mapped to a globally unique master ID of the device. Such mapping may be stored as part of the digital twin description DTD in the DTS and/or it can be stored by the information sources or their associated model providers. In general, the digital twin description DTD stores the semantics of the digital twin which includes the model kinds of interest for that particular digital twin, the lifecycle semantics of the digital twin, etc.

The DTS has a digital twin manager component DTM which is responsible to process data model elements provided by the discovered model providers and to manage the lifecycle of the digital twin. In one embodiment, the DTS has a lifecycle management component LMC which may describe lifecycle semantics of the device by using formalisms, such as for example, state machines. An example logic implemented by such a state machine is: upon the availability of a first data model which is relevant to the digital twin of the device, construct the digital twin and add the data model to the collected models CM1. The lifecycle management component implements such logics. That is, when a new device is discovered by a DTS which has no digital twin at that moment, the LMC state machine triggers the creation of the corresponding digital twin in the DTS and is adding the data model(s) provided by the physical device at that time. The newly created digital twin is then dynamically enhanced over time by adding further data models from other information sources providing lifecycle data of said device.

For example, when the DTS receive a request from 1 for data associated with the device which cannot be served based on the already collected data models CM1, the DC launches a discovery process to discovering a model provider MP3 which is connected to an information source DB able to provide the requested data. For this purpose, the DTS obtains the semantic model kind description MK3 from the discovered model provider MP3. MK3 provides semantic metadata about the data models of DB. The obtained model kind description MK3 is compared by the DTM with the model kinds of interest stored in the DTD of DTS. If there is a match, the DTM generates a mapping between model elements of data models associated with MK3 and corresponding model elements of the collected data CM1 via the semantic relationships as defined in SRD.

Thereby, the relations between data models originating from different information systems having different formats are maintained in the semantic relations descriptions SRD of the DTS. The SRD is interpreted by Digital Twin Manager DTM to establish references among the various collected data models CM1. These references are automatically updated as data models are added to or removed from the digital twin. For example, if the model kind description MK3 of the discovered model provider MK3 matches with the model kinds of interest included in the semantic description DTD, and a corresponding data model of DB was therefore added to the collected data models DM1 one or more model element types are derived from the added data model. Semantic relations between the one or more model element types of the added data model and model element types of pre-existing data models are then established in SRD (e.g., by receiving corresponding inputs from a user or by extracting the relations from a semantic dictionary of a suitable technical specification). The semantic relations defined in SRD are used at runtime to connect model elements from different information sources along the life cycle of the device.

The digital twin manager DTM may be configured by a digital twin manager configuration component DTMC. Various configurations may be applied. For example, administrators may configure the digital twin to pull information from specific sources, or to only keep references to the original data instead of copying them inside the digital twin. Another example of a particular configuration is about the deployment of digital twins, which can be fully or partially on the cloud, edge or device, or any combination of these. In other words, the DTMC may be adapted to select a deployment mode for the digital twin. The deployment mode can be selected for each data model in the collected data models for deployment to a cloud network, edge or device itself. The term edge is used herein in the meaning of edge computing which pushes applications, data and computing power (services) away from centralized points to locations closer to the user. For example, if a digital twin contains a data model keeping the operational parameters of a device, a data model for engineering information and a data model for maintenance information, the first data model can be stored within the device itself, and only a reference to that is maintained inside the digital twin; the other data models and the digital twin can be stored, for example, in the cloud.

Another configuration is about synchronization of multiple models, for example, upon availability of both engineering and operational models of a device, the engineering parameters may be downloaded into the operational parameters to facilitate a plug and produce use case where device related data from different life cycles of the device can be instantaneously exchanged between engineering and operational models once they are plugged into the DTS. That is, once their models become part of the collected models and the corresponding semantic relations are established they are immediately available for "production" (i.e., to be used to enable the interoperable data exchange between the respecting information systems). In general, the configuration module DTMC is further adapted to activate a synchronization mode for the digital twin to synchronize a data model associated with an information source associated with a first life cycle phase of the device with a data model associated with an information source associated with a second life cycle phase in that parameters of the first life cycle phase are loaded into parameters of the second life cycle phase. Information sources and their corresponding model provider may be excluded/disappear from the system at any time, for example, when the device itself becomes defect and stops operating. Different policies may be supported upon the disappearance of each model provider: keeping latest information, showing missing links to the original information source, etc. Policies can be defined by the referenced semantic and executed by the Plug and Collect process.

Figure 4:
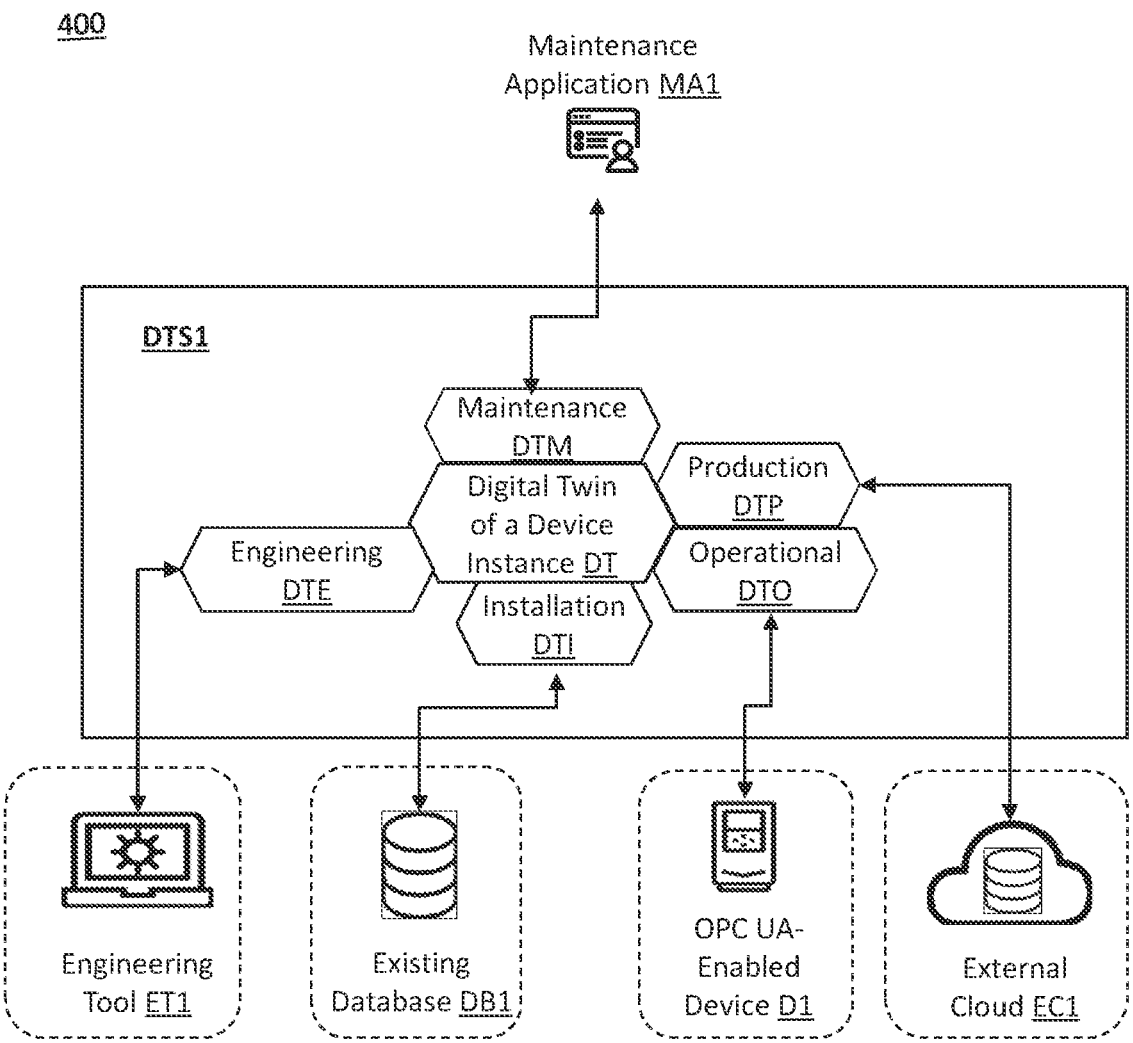
FIG. 4 shows and example of various device life cycle data categories provided by various information sources.

FIG. 4 illustrates an example 400 of how a digital twin DT originally generated for a particular device instance can be augmented with life cycle data provided by various information systems. For simplicity, the function modules and interfaces of the digital twin service DTS1 as well as the respective model providers are not shown in FIG. 4. It is assumed that the digital twin was generated by the state machine of DTS1 when the corresponding OPC UA-enabled device D1 was discovered by DTS1. The device D1 can continuously push its operational data (e.g., sensor data, data about the internal state of D1, etc.) to the digital twin covering the operational life cycle aspects of the device D1. The corresponding collected data models DTO form part of the digital twin DT. Further data models of the digital twin DT may be collected from other information systems. For example, a production system hosted in an external cloud EC1 may provide data models DTP related to the production of the device. A database DB1 may provide data models DTI related to the installation of said device. An engineering tool ET1 may provide data models DTE to DT in relation to the engineering phase of the device. And a maintenance application MA1 may provide data models DTM in relation to the maintenance phase of the device D1. Typically, all information systems use their own proprietary data models with local identifiers of the device D1 which are mapped to a master ID of the digital twin (e.g., the serial number of DT). The semantic relations between model element types of the various data models DT including DTE, DTI, DTO, DTP, and DTM in the semantic relations library of DTS1 allow to generate mappings between instances of the model elements when a request for data of any of the connected information systems is received by DTS1. For example, the maintenance application MA1 may request operational data from D1 and data from its engineering phase. For this purpose a mapping is generated between the respective data models DTM, DTO and DTE. Based on this mapping, MA1 can now retrieve the operation data of D1 which may be either already stored by DT in cases where the device D1 pushes its data to the digital twin, or the data may be retrieved from the device D1 because DTS1 knows how to access the requested data via the generated mapping. Similarly, requested data the engineering tool ET1 can be accessed by DTS1 via the corresponding mapping. Finally, the retrieved data is provided to the requesting information system MA1 using the mapping between DTE, DTO and DTM. This allows to provide the data to MA1 in the format of the proprietary data models of MA1 so that MA1 can immediately make use of the provided data without further transformation. As mentioned earlier, there may be more digital twins for the same physical device covering different aspects of the device with each digital twin provided by a respective digital twin service.

Figure 5:
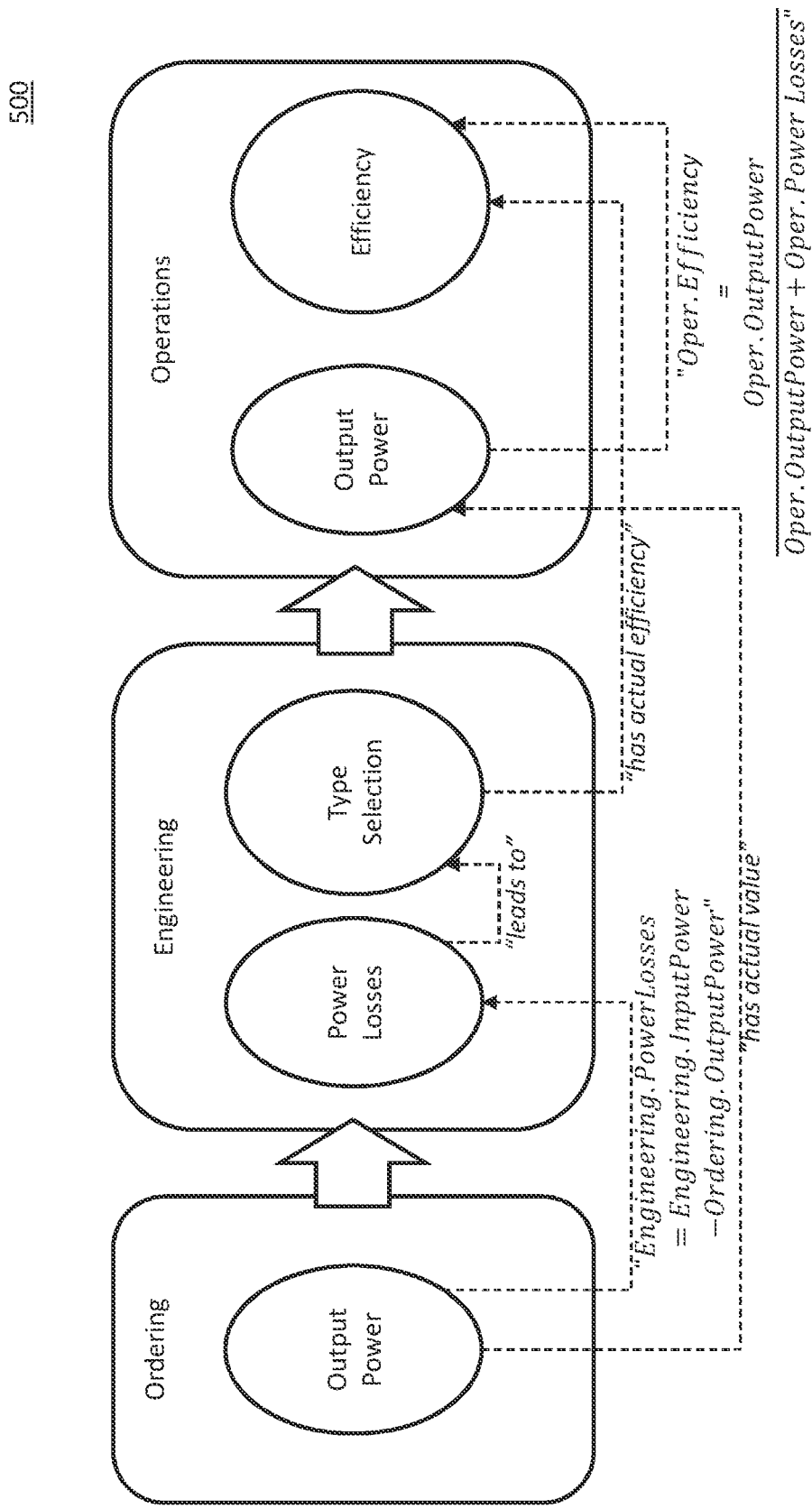
FIG. 5 is an example of semantic relations stored in a semantic relations library according to an embodiment.

FIG. 5 shows an example of semantic relations stored in a semantic relations library in a graph representation 500 according to an embodiment. In the example, the semantic relations are visualized via the graph representation 500 which can be generated reflecting the semantic relations between model element types. Such a graph representation connecting data model elements can be advantageously used for subsequent queries, for example, to retrieve information about the device lifecycle (e.g., ordering, engineering, operation).

Semantic relations (semantic links) for describing relationships between model element types in data models from different information sources are collected and stored in the semantic relations library of the digital twin service. First, the data model element types can be derived from the information source data models and may be stored in common or proprietary semantics within the semantic relations library. It is assumed that each model element has a stable, unique identifier associated with it which can be used for reference purposes in the semantic links. The semantic links are formed using domain expert knowledge from user inputs or from technical documentation (e.g., order specifications, information system code repository, technical reports, user guides, technical semantic dictionaries, or the like). The sematic links describe one-to-one, one-to-many, and many-to-many relationships between the different model element types using suitable formalisms, such as for example, common ontologies and mathematical formulas.

The example in FIG. 5 illustrates semantic links indicated by dashed arrows connecting data model element types, referenced by their identifiers, from different information sources along a lifecycle using common terms and formulas. The semantic links can be stored as directed graphs with each edge (illustrated by dashed arrows) defining a link of the form E=(N1,N2,R), where N1 refers to the node at the tail-end of the arrow, N2 refers to the node at the head of the arrow, and R is the semantic link from N1 to N2.

Here is a description of the different types of semantic relations shown in FIG. 5:
 a. Definite Ontological Relation: (Ordering.OutputPower, Oper.OutputPower, "has actual value") defines the semantic link expressing that "Output Power" specified during an "Ordering" phase "has actual value" given by "Output Power" as measured during "Operations" phase.
 b. Descriptive Ontological Relation: (Engineering.PowerLosses, Engineering.TypeSelection, "leads to") means that "Engineering.PowerLosses" value leads to or influences the value of "Engineering.TypeSelection".
 c. Mathematical Relation: (Ordering.OutputPower,Engineering.PowerLosses, "Engineering.PowerLosses=Engineering.InputPower–Ordering.OutputPower") expresses the formula-based semantic connection between the values of "Ordering.OutputPower" and "Engineering.PowerLosses".

The semantic links can also be used for discovery. For instance, given the element Engineering.TypeSelection, the semantic relations stored in the semantic relations library can be navigated to discover the semantically linked "Engineering.PowerLosses" and "Operations. Efficiency" elements.

FIG. 6 illustrates multiple layers of a digital representation (digital twin) of a physical device according to an embodiment. The model element representation 600 of a digital twin may be implemented as a layered description of the digital twin model elements, model element types, and relation types. It can be systematically organized using the IEC 62714 AutomationML standard with its Instance Hierarchies, System Unit Class Libraries, Role Class Libraries, and Interface Class Libraries. IEC 62714-1:2014 (obtainable at http://www.iec-normen.de/220904/iec-62714-1-2014-06-ed-1-0-zweisprachig.html) is a solution for data exchange focusing on the domain of automation engineering. The data exchange format defined in the IEC 62714 series (Automation Markup Language, AutomationML) is an XML schema based data format and has been developed in order to support the data exchange in a heterogeneous engineering tools landscape. The goal of AutomationML is to interconnect engineering tools in their different disciplines, e.g. mechanical plant engineering, electrical design, process engineering, process control engineering, HMI development, PLC programming, robot programming, etc.

The first layer "Layer 1" includes the "Model Library". This layer contains the various models with their model elements (e.g., Ordering Model Elements, Engineering Model Elements. Operational Model Elements, etc.), their attributes, and their values related to the device, such as for example, the model element "Drive Efficiency" of an engineering model of a particular drive together with its value: "95%". Using AutomationML, the model elements can be represented as internal elements within an instance hierarchy. Internal Element Attributes with accompanying fields of "Value", "Unit", "Data type" can be used to store model element attributes and their values. The models with their model elements can originate from different information systems IS1, IS2 being used as origin indicators in the corresponding model/model element names. The models/model elements of Layer 1 are instances of the corresponding types in Layer 2. For example, "Engineering Model IS1" is an instance of model type "Engineering Model 1 Type", "Engineering Model IS2" is an instance of model type "Engineering Model 2 Type", and so on.

The second layer "Layer 2" includes the "Model Type Library". The types of the model elements (e.g., Ordering Model Element Types, Engineering Model Element Types, Operational Model Element Types, etc.) together with any element type-level information such as semantic description SD and associated attributes (e.g., identifier ID) can be stored in the second layer. Any semantic relations among the element types can also be shown at this level. In AutomationML, the element types can be categorized as System Unit Classes designed for reusable components. The semantic descriptions can be stored in the class Description field or instantiated from Role Classes used for defining abstract object semantics. Finally, the element type relations can be instantiated using Interface Classes.

The third layer "Layer 3" includes the "Semantic Relation Type Library". Any semantic relations describing the relationship between element types in "Layer 2" can be abstracted and stored in the Semantic Relation Type Library for reuse. The "Semantic Relationship Types" are instantiated as model element types. Within AutomationML, these semantic relations can be stored as Interface Classes within Interface Class Libraries.

Figure 7:
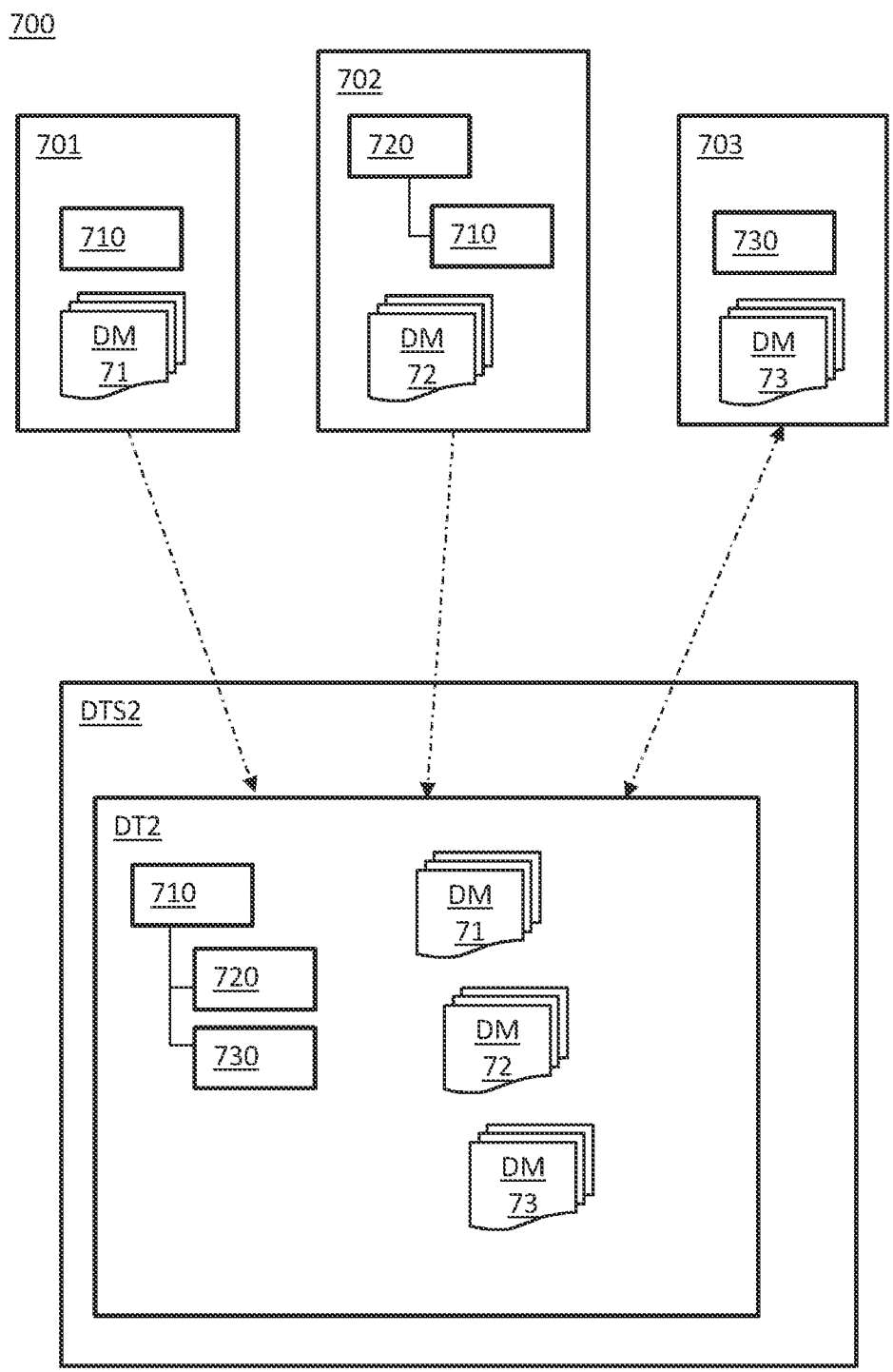
FIG. 7 illustrates a particular digital twin example for drive device.

FIG. 7 illustrates and example scenario 700 for a digital twin DT2 of a drive device 701. For reason of simplicity, only the content of the drive's digital twin DT2, i.e. the collected data models and identifiers are shown. The functions of the digital twin service DTS2 (e.g., logic to collect models, construct the digital twin, establish semantic relationships, etc.) are omitted in FIG. 7. DTS2 is running even before a digital twin (e.g. DT2) is constructed, as DTS2 is responsible for the construction. In other words, DTS2 can instantiate the digital twin DT2 when executing its state machine accordingly.

In the example, each information system has its own identification mechanism. The device in the example is drive 701 which has serial number 710. The installed-based data base 702 has an installation ID 720 and knows that the serial number 710 is associated with ID 720. The engineering system 703 uses an engineering ID 730 for representing the drive 701. The ID 720 is different from the serial number 710 because at the engineering phase, the physical device may not yet have been manufactured. The drive 701 provides the data model(s) DM71, data base 702 provides the data model(s) DM72, and the engineering system 703 provides the data model(s) DM73 (e.g., via corresponding model providers).

To be able to aggregate these models into the digital twin DT2, the serial number 710 of the drive serves as "master ID" to which all other local IDs 720, 730 are mapped/aliased. The ID mapping is defined by the digital twin service DTS2 and stored in the digital twin DT2. The mapping between the master ID 710 and the local IDs 720, 730 can be implemented in two ways.

In one embodiment, the mapping can be generated automatically if the respective information system 702 includes the serial number 710 (master ID) as part of the drive specific information records. For example, an add-in for the information source can ensure that every time an information record is constructed in the information system 702, a corresponding mapping information is also created which maps the local ID 720 to the serial number 710. It is to be noted that an information source in general only knows its local ID and, if available, a mapping to the master ID. For example, if the Installed-based data base 702 has a data record like (Installation ID, Installation Address, Installation Date, Serial Number), the add-in can extract the serial number 710 from this record and use it to communicate with digital twin DT2. In other words, the data records of data base 702 are created with the installation ID and the serial number 710 is added to each record based on the knowledge that it is the master ID for the respective local ID 720. The occurrence of the serial number can then be used as a reference to reach the digital twin DT2. In such a set up the information system is even able to push data to the digital twin when detecting an occurrence of the digital twin reference 710 in a data record.

In one embodiment, the mapping can be generated manually if the information source 703 does not have the master ID 710 as part of its information record. In this case the digital twin receives the ID mapping 710-730 from a user providing manual input via semantic relations. Within the digital twin DT2, the local IDs 720, 730 of information sources 702, 703 can be aggregated and aliased, and can be used to communicate with the information sources. In other words, device specific data at the respective information sources are identified via said local IDs which are associated with the device in said hierarchy via the master ID 710.

It is assumed that the beginning there is no digital twin in DTS2. Then the drive 701 is plugged into the network with serial number 710. The device 710 is discovered by DTS2 as one information source/model provider and corresponding digital twin DT2 is created with the master ID 710. In general, the master ID can be any identifier and can also be set by DTS2. For example, any other available ID could become the master ID (e.g., an ID from the engineering phase or even a number generated by a counter of DTS2). In general, discovery is about finding a model provider on the network and once it is found DTS2 can pull information from the discovered information system, or the discovered information system can push data to the digital twin DT2. Devices, such as drive 701, can either be treated as native model providers telling which models they offer, or they may use a model provider that treats the device as an information system like any other information system.

The drive 701 communicates its serial number to the digital twin service DTS2. DTS2 recognizes that there is no digital twin available for the drive 701 and constructs digital twin DT2. The serial number 710 is stored in digital twin DT2 as the master ID. This way a connection is established between the device 701 and its digital twin DT2. Further, the data model(S) DM71 of the drive or at least references to such data model(s)n are imported into the digital twin DT2. The device 701 can directly push all of its operational parameters into the corresponding digital twin DT2 as the imported data model(s) DM71 are identical to the original data model(s) of the drive. Using a push mechanism for the drive 701 ensures that DT2 is kept in sync with real device 701. Alternatively, operational data may be pulled from the device at a certain sampling frequency which however would cause additional network traffic.

The digital twin service DTS2 may now discover the model provider of the Installed-based data base 702 as model provider with model kinds that are useful to expand DT2 with installation information of the drive. The corresponding data model(s) DM72 (or references) are added to DT2. After establishing corresponding sematic relations, DTS2 may query the database 702 using the serial number 710. The Installed-based data records already contain the mapping between serial number 710 and Installation ID 720. Therefore, the device related installed-based data records can be retrieved and provided to DT2. In case the master ID is not known at the information source the device related data may be identified by using a query that describes the device based on information that exists in the information source. For example: get the device that is located in building X and is installed on a certain date. The installed-based model provider queries the relevant information based on the Installation ID as known from the identifier mapping and returns it to the digital twin DT2.

The engineering tool 703 may store engineering information on a storage medium. An associated model provider monitors the files that are stored on a folder and reads their content. Once the engineering tool 703 is discovered via its associated model provider, DTS2 can import the provided data model(s) DM73 or respective references into DT2. Semantic relations between DM73 and DM71, DM72 are established for mapping generation to enable data exchange between the information systems 701, 702, 703. For example, semantic relationships in the example can be meaningful between engineering parameters and operational parameters of the drive. In case the engineering tool knows the serial number 710 (master ID) of the drive, the content including engineering information and the design number 730 can be pushed to digital twin service DTS2. The engineering model provider may only push a subset of engineering information. Another alternative is shown in FIG. 7 where the engineering tool 703 is not aware of the master ID and only stores data records in relation to the local device ID (design number 730). In this scenario, the digital twin service DTS2 queries the engineering model provider for specific information and uses the identifier hierarchy relation 710-730 for retrieving the drive related data from information source 703.

Figure 8:
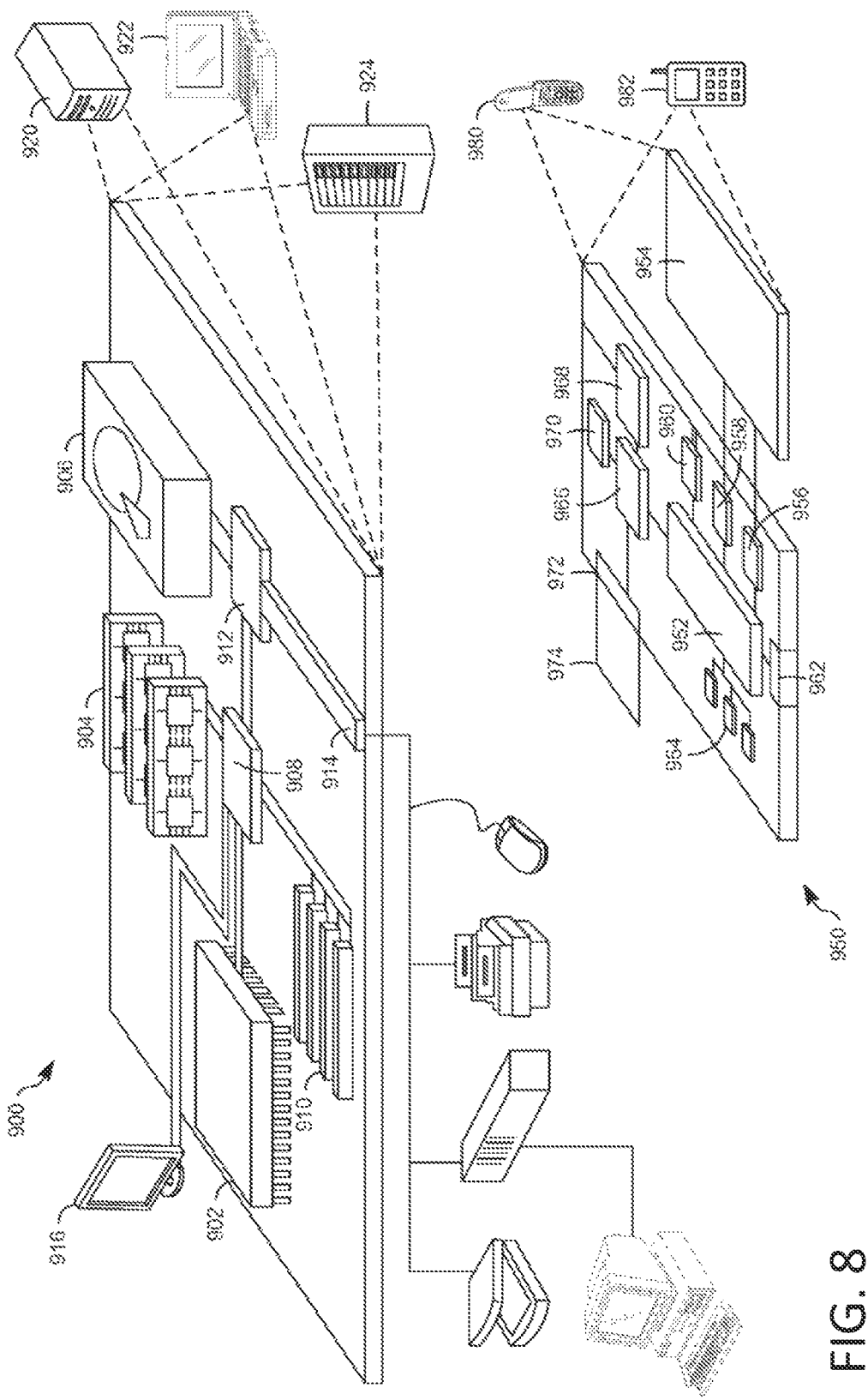
FIG. 8 is a diagram that shows an example of a generic computer device and a generic mobile computer device, which may be used with the techniques described herein.

FIG. 8 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may be used to implement the computer system 100 of FIG. 1. Computing device 950 is intended to represent various forms of mobile devices, such as personal digital assistants, cellular telephones, smart phones, and other similar computing devices. For example, computing device 950 may be used by a human domain expert for interacting with the computer system 900 to define semantic relations in the semantic relations library. The components shown here, their connections and relationships, and their functions, are meant to be exemplary only, and are not meant to limit implementations of the inventions described herein.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards. In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device, such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver. In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer system for interoperable data exchange between a plurality of information systems via a digital representation service associated with a digital representation of a physical device with each information system being at least one of an information source and an information consumer regarding data associated with the physical device, the digital representation being a virtual entity replicating data of the physical device and data associated with the device life cycle, the system comprising:
   at least one digital representation service for the physical device, the at least one digital representation service comprising:
      an interface configured to receive a request for device related data;
      a management module configured to generate and update the digital representation of the device, the digital representation being configured to store a plurality of data models with each stored data model being associated with a particular information system; and
      a semantic relations library storing semantic relations between model element types from stored data models of different information systems, wherein each stored data model provides data associated with the device life cycle, and wherein each model element type is derived from a corresponding stored data model of the management module,
   wherein each digital representation service of the at least one digital representation service is configured to:
      generate a mapping between model elements of data models associated with at least two different information systems via the semantic relationships as defined in the semantic relations library as a generated mapping; and
      in response to the request, execute data exchange between at least two information systems in accordance with the generated mapping.

2. The computer system of claim 1, wherein the digital representation service further comprises:
   a semantic description of the digital representation including model kinds of interest for the digital representation;
   wherein the digital representation service is configured to establish new semantic relations in the semantic relations library by:
      discovering one or more model providers, each model provider being associated with one or more information systems, as discovered one or more model providers;
      obtaining from the discovered one or more model providers semantic model kind descriptions in relation to information provided by the respective one or more information systems, a particular model kind description providing semantic metadata about one or more data models of one or more corresponding information systems;
      identifying a particular discovered model provider with a particular model kind description matching the model kinds of interest included in the semantic description;
      if a data model corresponding to the particular model kind description is not included in the plurality of data models, adding the corresponding data model as provided by the particular model provider to the plurality of data models as an added data model;
      deriving one or more model element types from the added data model; and
      receiving, from a user or from a technical specification, semantic relations between the one or more model element types of the added data model and model element types of pre-existing data models to connect model elements from different information sources along a life cycle of the device.

3. The computer system of claim 1, wherein the digital representation service is configured to process model elements obtained from the discovered information sources to manage a life cycle of the digital representation using a state machine reflecting the life cycle of the digital representation.

4. The computer system of claim 1, wherein the digital representation service is configured to generate a graph representation reflecting the semantic relations between model element types, the graph representation being used for queries by a user.

5. The computer system of claim 1, wherein the digital representation service further comprises a configuration module configured to switch between a replication mode and a referencing mode,
  wherein, in the replication mode, accessed information source data is copied to the digital representation, and
  wherein, in the referencing mode, references to the accessed information source data are stored in the digital representation.

6. The computer system of claim 5, wherein the configuration module is configured to select a deployment mode for the digital representation, and
  wherein the deployment mode for each data model of the digital representation is selectable from any one of the following: deployment of the data model on a cloud network, deployment of the data model to an edge, or deployment of the data model to a device.

7. The computer system of claim 5, wherein the configuration module is configured to: activate a synchronization mode for the digital representation, and
  wherein a data model associated with an information source associated with a first life cycle phase of the device is synchronized with a data model associated with an information source associated with a second life cycle phase in that parameters of the first life cycle phase are loaded into parameters of the second life cycle phase.

8. The computer system of claim 1, wherein each digital representation service of the at least one digital representation service is further configured to:
  derive, from each of the stored data models, a respective model element type of the model elements types and an associated unique identifier; and
  generate at least one semantic relation of the semantic relations between the respective model element type and at least one further model element type of the model element types based on a formalism.

9. The computer system of claim 8, wherein each digital representation service of the at least one digital representation service is further configured to:
  store each model element type as a node of a directed graph and store each semantic relation as an edge of the directed graph between a node of the respective model element type and a node of the at least one further model element type.

10. A computer implemented method for interoperable data exchange between a plurality of information systems via a digital representation service associated with a digital representation of a physical device with each information system being at least one of an information source and an information consumer regarding data associated with the physical device, the digital representation being a virtual entity replicating data of the physical device and data associated with the device life cycle, the method being executed by a digital representation service associated with a particular digital representation of the physical device with the digital representation service comprising a semantic relations library storing semantic relations between model element types from stored data models of different information systems, the method comprising:
  receiving a request from an information consumer for data associated with the physical device;
  generating a mapping between model elements of data models associated with at least the requesting information consumer and a corresponding information source via the semantic relationships as defined in the semantic relations library of the digital representation service as a generated mapping, wherein each data model provides data associated with the device life cycle, and wherein each model element type is derived from a corresponding data model of the management module; and
  in response to the request, executing data exchange between at least the requesting information consumer and a corresponding information source in accordance with the generated mapping.

11. The method of claim 10, further comprising:
  discovering one or more model providers, each model provider being associated with one or more information systems, as discovered one or more model providers;
  obtaining from the discovered one or more model providers semantic model kind descriptions in relation to data provided by the respective one or more information systems, a particular model kind description providing semantic metadata about one or more particular data models of one or more corresponding information sources, as obtained model kind descriptions;
  comparing the obtained model kind descriptions with model kinds of interest stored in a semantic description of the digital representation service; and
  if a particular discovered model provider has a particular model kind description matching the model kinds of interest included in the semantic description, and if a data model corresponding to the particular model kind description is not included in a plurality of data models of the digital representation, adding the corresponding data model as provided by the particular model provider to the plurality of data models as an added data model.

12. The method of claim 11, further comprising:
  deriving one or more model element types from the added data model; and
  receiving, from a user or from a technical specification, semantic relations between the one or more model element types of the added data model and model element types of pre-existing data models to connect model elements from different information sources along a life cycle of the device.

13. The method of claim 11, further comprising:
  processing model elements obtained from discovered information sources to manage a life cycle of the digital representation using a state machine reflecting the life cycle of the digital representation.

14. The method of claim 10, further comprising:
  switching between a replication mode and a referencing mode,
  wherein, in the replication mode, accessed information source data is copied to the digital representation, and
  wherein, in the referencing mode, references to the accessed information source data are stored in the digital representation.

15. The method of claim 10, further comprising:
  activating a synchronization mode for the digital representation in which a data model associated with an information system associated with a first life cycle phase of the device is synchronized with a data model associated with an information system associated with a second life cycle phase in that parameters of the first life cycle phase are loaded into parameters of the second life cycle phase.

16. The method of claim 10, wherein the semantic relations between model element types selectable from any one of: Definite Ontological Relation, Descriptive Ontological Relation, and Mathematical Relation.

17. A computer program product comprising instructions that, when loaded into a memory of a computing device and executed by at least one processor of the computing device, execute the method of claim 10.

* * * * *